(12) United States Patent
Kowarz et al.

(10) Patent No.: US 6,172,796 B1
(45) Date of Patent: Jan. 9, 2001

(54) MULTILEVEL ELECTRO-MECHANICAL GRATING DEVICE AND A METHOD FOR OPERATING A MULTILEVEL MECHANICAL AND ELECTRO-MECHANICAL GRATING DEVICE

(75) Inventors: Marek W. Kowarz; Brian E. Kruschwitz, both of Rochester, NY (US)

(73) Assignee: Eastman Kodak Company, Rochester, NY (US)

(*) Notice: Under 35 U.S.C. 154(b), the term of this patent shall be extended for 0 days.

(21) Appl. No.: 09/216,559

(22) Filed: Dec. 18, 1998

(51) Int. Cl.$^7$ ..................................................... G02B 26/00
(52) U.S. Cl. ......................... 359/290; 359/291; 359/295; 359/572; 359/224
(58) Field of Search .................................... 359/290, 291, 359/295, 572, 573, 224

(56) References Cited

U.S. PATENT DOCUMENTS

| | | | |
|---|---|---|---|
| 4,011,009 | 3/1977 | Lama et al. | 350/162 R |
| 4,492,435 | 1/1985 | Banton et al. | 350/360 |
| 4,596,992 | 6/1986 | Hornbeck | 346/76 PH |
| 5,115,344 | 5/1992 | Jaskie | 359/573 |
| 5,311,360 | 5/1994 | Bloom et al. | 359/572 |
| 5,459,610 | 10/1995 | Bloom et al. | 359/572 |
| 5,661,593 | 8/1997 | Engle | 359/291 |
| 5,677,783 | 10/1997 | Bloom et al. | 359/224 |
| 5,757,536 | 5/1998 | Ricco et al. | 359/224 |
| 5,808,797 | 9/1998 | Bloom et al. | 359/572 |
| 5,949,570 | * 9/1999 | Shiono et al. | 359/291 |
| 5,999,319 | * 12/1999 | Castracane | 359/573 |

* cited by examiner

*Primary Examiner*—Georgia Epps
*Assistant Examiner*—Timothy Thompson
(74) *Attorney, Agent, or Firm*—William F. Noval; Stephen H. Shaw

(57) ABSTRACT

A method for operating an electro-mechanical grating device comprises the steps of:
  providing a beam of light;
  applying a first electrostatic actuation force for a certain amount of time thereby generating a first pattern in each group wherein the pattern comprises N different levels thereby diffracting the incident light beam into a first direction; and
  applying a second electrostatic actuation force for a certain amount of time thereby generating a second pattern in each group wherein the second pattern comprises N different levels thereby diffracting the incident light beam into a second direction different from the first direction.

The electro-mechanical grating device has a plurality of spaced apart deformable ribbon elements disposed parallel to each other in the unactuated state and spanning a channel. The deformable ribbon elements are organized in groups of N elements wherein N is greater than 2. A plurality of standoffs are provided, wherein according to the longitudinal direction of the electro-mechanical grating device at least N-2 standoffs are associated with each group.

21 Claims, 10 Drawing Sheets

MULTILEVEL ELECTRO-MECHANICAL GRATING DEVICE AND A METHOD FOR OPERATING A MULTILEVEL MECHANICAL AND ELECTRO-MECHANICAL GRATING DEVICE

CROSS REFERENCE TO RELATED APPLICATIONS

Cross reference is made to U.S. Ser. No. 09/216,289, filed Dec. 18, 1998, entitled "A Mechanical Grating Device" and to U.S. Ser. No. 09/215,973, filed Dec. 18, 1998, entitled "Method For Producing Co-Planar Surface Structures."

FIELD OF THE INVENTION

This invention relates to the field of modulation of an incident light beam by the use of a mechanical grating device. More particularly, this invention discloses a multilevel electro-mechanical grating device which has a significant improvement in the output of the diffracted light beam by approximating a continuous blaze grating with n discrete levels. Furthermore, the invention relates to a method for operating a multilevel mechanical and electro-mechanical grating device.

BACKGROUND OF THE INVENTION

Electro-mechanical spatial light modulators have been designed for a variety of applications, including image processing, display, optical computing and printing. Optical beam processing for printing with deformable mirrors has been described by L. J. Hornbeck; see U.S. Pat. No. 4,596,992, issued Jun. 24, 1986, entitled "Linear Spatial Light Modulator and Printer". A device for optical beam modulation using cantilever mechanical beams has also been disclosed; see U.S. Pat. No. 4,492,435, issued Jan. 8, 1995 to Banton et al., entitled "Multiple Array Full Width Electromechanical Modulator," and U.S. Pat. No. 5,661,593, issued Aug. 26, 1997, to C. D. Engle entitled "Linear Electrostatic Modulator". Other applications of electro-mechanical gratings include wavelength division multiplexing and spectrometers; see U.S. Pat. No. 5,757,536, issued May 26, 1998, to Ricco et al., entitled "Electrically-Programmable Diffraction Grating".

Electro-mechanical gratings are well known in the patent literature; see U.S. Pat. No. 4,011,009, issued Mar. 8, 1977 to Lama et al., entitled "Reflection Diffraction Grating Having a Controllable Blaze Angle", and U.S. Pat. No. 5,115,344, issued May 19, 1992 to J. E. Jaskie, entitled "Tunable Diffraction Grating". More recently, Bloom et al. described an apparatus and method of fabrication for a device for optical beam modulation, known to one skilled in the art as a grating-light valve (GLV); see U.S. Pat. No. 5,311,360, issued May 10, 1994, entitled "Method and Apparatus for Modulating a Light Beam". This device was later described by Bloom et al. with changes in the structure that included: 1) patterned raised areas beneath the ribbons to minimize contact area to obviate stiction between the ribbon and substrate; 2) an alternative device design in which the spacing between ribbons was decreased and alternate ribbons were actuated to produce good contrast; 3) solid supports to fix alternate ribbons; and 4) an alternative device design that produced a blazed grating by rotation of suspended surfaces; see U.S. Pat. No. 5,459,610, issued Oct. 17, 1995, to Bloom et al., entitled "Deformable Grating Apparatus for Modulating a Light Beam and Including Means for Obviating Stiction Between Grating Elements and Underlying Substrate," and U.S. Pat. No. 5,808,797, issued Sep. 15, 1998 to Bloom et al., entitled "Method and Apparatus for Modulating a Light Beam." Bloom et al. also presented a method for fabricating the device; see U.S. Pat. No. 5,677,783, issued Oct. 14, 1997, entitled "Method of Making a Deformable Grating Apparatus for Modulating a Light Beam and Including Means for Obviating Stiction Between Grating Elements and Underlying Substrate".

The GLV device can have reflective coatings added to the top surface of the ribbons to improve the diffraction efficiency and lifetime of the GLV device. Preferred methods of fabrication use silicon wafers as the substrate materials requiring the device to operate in reflection for the wavelengths of interest. An increase in reflectivity is important to reduce damage of the top surface of the ribbons and avoid mechanical effects that might be attributed to a significant increase in the temperature of the device due to light absorption.

For GLV devices, the position and height of the ribbons has been symmetric in design. One drawback to this design is an inability to isolate the optical intensity into a single optical beam. This relatively poor optical efficiency is primarily due to the symmetry of the actuated device, which produces pairs of equal intensity optical beams. Each period of the improved grating must include more than two ribbons and create an asymmetric pattern of the ribbon heights. By creating an asymmetric pattern for the heights of the actuated ribbons, the intensity distribution of the diffracted optical beams is asymmetric and can produce a primary beam with a higher optical intensity. The direction of this primary diffracted beam can be switched by creating a different second actuated state for the ribbon heights. Unique to this work is the use of multiple heights in a GLV to create an asymmetric grating profile for improved optical diffraction efficiency that can be switched between two actuated states.

SUMMARY OF THE INVENTION

It is an object of the present invention to provide a method for operating a mechanical grating device so that an improved optical diffraction efficiency can be achieved. Furthermore, with the inventive method light can be efficiently and independently coupled into three different angles.

The object is achieved by a method for operating a mechanical grating device having a plurality of spaced apart deformable ribbon elements disposed parallel to each other in the unactuated state and spanning a channel, wherein the ribbon elements define a top surface and each ribbon element defines a discrete level, said deformable ribbon elements are organized in groups of N elements wherein N is greater than 2, the method comprising the steps of:

providing a beam of light;

applying a first actuation force pattern to the ribbon elements of each group for a certain amount of time thereby generating a first pattern in each group wherein the pattern comprises N different levels thereby diffracting the incident light beam into a first direction; and applying a second actuation force pattern to the ribbon elements of each group for a certain amount of time thereby generating a second pattern in each group wherein the second pattern comprises N different levels thereby diffracting the incident light beam into a second direction different from the first direction.

Another object of the present invention is to provide a method for operating an electro-mechanical grating device so that an improved optical diffraction efficiency can be achieved. Furthermore, with the inventive method light can be efficiently and independently coupled into three different angles.

The above object is achieved by a method for operating an electro-mechanical grating device having a plurality of spaced apart deformable ribbon elements disposed parallel to each other in the unactuated state and spanning a channel, wherein the ribbon elements define a top surface and each ribbon element defines a discrete level, said deformable ribbon elements are organized in groups of N elements wherein N is greater than 2 and a plurality of standoffs are provided, wherein according to the longitudinal direction of the device at least N-2 standoffs are associated with each group, the method comprising the steps of:

providing a beam of light;

applying a first electrostatic actuation force pattern to the ribbon elements of each group for a certain amount of time thereby generating a first pattern in each group wherein the pattern comprises N different levels thereby diffracting the incident light beam into a first direction; and applying a second electrostatic actuation force pattern to the ribbon elements of each group for a certain amount of time thereby generating a second pattern in each group wherein the second pattern comprises N different levels thereby diffracting the incident light beam into a second direction different from the first direction.

A further object of the invention is to provide a electro-mechanical grating device which has improved optical diffraction efficiency and improves the contrast of an electro-mechanical multilevel grating device. Furthermore the electro-mechanical grating device should operate as a three-way light valve.

This object is achieved by an electro-mechanical grating device comprising:

a base having a surface;

a spacer layer, having an upper surface, is provided above the base, and a longitudinal channel is formed in said spacer layer, said channel having a first and second opposing side wall and a bottom;

a first conductive layer is provided below the bottom of the channel;

a plurality of spaced apart deformable ribbon elements disposed parallel to each other and spanning the channel, said deformable ribbon elements defining a top and a bottom surface and are fixed to the upper surface of the spacer layer on each side of the channel, said deformable elements are organized in a plurality of groups of N elements wherein N is greater than 2;

each of said groups forms a pattern of discrete levels in an actuated state wherein the pattern has N different levels; and a second conductive layer being part of each deformable ribbon element wherein the $j^{th}$ element in each group is electrically connected to the $j^{th}$ elements in all other groups.

ADVANTAGES

It is an advantage of the inventive multilevel electro-mechanical grating device, that suspended ribbons modulate an optical beam by individual actuation of the ribbon elements. The actuation of the ribbon elements, which changes the height of the ribbons relative to the substrate, is a result of an applied voltage that produces an electrostatic force. The position of the ribbons across the area of the substrate and the periodic sequence of the ribbon heights can be used to improve the diffraction efficiency of the optical beam. This invention presents a design for an electro-mechanical grating device that produces periodic sequences of ribbon heights that resemble blazed gratings with discrete levels that can efficiently and independently couple light into three different angles.

The GLV described herein incorporates multiple levels, which means more than two, to discretely approximate a blazed grating. By controlling which ribbons are actuated, the intermediate levels can be used to approximate blazed gratings for either the +1 or the −1 diffracted order. Furthermore, by not actuating any of the ribbon elements, the multilevel grating device acts as a reflective plane, reflecting the light into the 0 order. Thus, light can be directed independently into three different angles, depending on which ribbons, if any, are actuated. Further advantageous effects of the present invention are disclosed in the dependent claims.

BRIEF DESCRIPTION OF THE DRAWINGS

The subject matter of the invention is described with reference to the embodiments shown in the drawings.

FIG. 13 illustrates two elements of a bi-level grating, one turned off and the other on; and FIG. 14 illustrates two elements of a multilevel grating, one turned off and the other on.

DETAILED DESCRIPTION OF THE INVENTION

Figure 1:
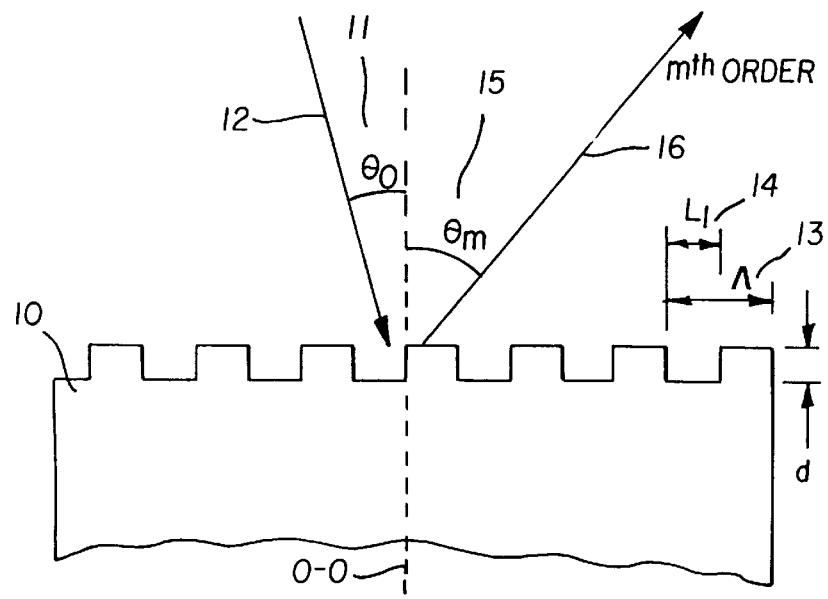
FIG. 1 is an illustration of diffraction from a binary reflective phase grating.

Periodic corrugations on optical surfaces (i.e. diffraction gratings) are well known to perturb the directionality of incident light. Collimated light incident in air upon a grating is diffracted into a number of different orders, as described by the grating equation, $$\sin\theta_m = \sin\theta_0 + m\lambda/\Lambda \quad (1)$$

where $\lambda$ is the wavelength of the light and m is an integer denoting the diffracted order. FIG. 1 illustrates a reflective grating 10 having an optical beam 12 incident on the grating 10 at an angle $\theta_0$ 11 with respect to an orthogonal axis O—O of the reflective grating 10. The grating surface is defined to have a period $\Lambda$ 13, which defines the angles of diffraction according to the relation presented in Equation 1. A diffracted beam 16 corresponding to diffraction order m exits the grating 10 at an angle $\theta_m$ 15.

The diffraction grating 10 pictured in FIG. 1 is a binary grating where the grating profile is a square wave. The duty cycle is defined as the ratio of the width of the groove $L_1$ 14 to the grating period $\Lambda$ 13. A binary phase grating will have the maximum diffraction efficiency when the duty cycle is equal to 0.5 and R, the reflectivity, is equal to 1.0.

For uniform reflectivity and 0.5 duty cycle, the relation presented in Equation 2 is appropriate for the calculation of the theoretical diffraction efficiency, within the accuracy of scalar diffraction theory.

$$\eta_m = R\cos^2\left(\frac{\pi}{\lambda}(q_m d - m\lambda/2)\right)\frac{\sin^2(m\pi/2)}{(m\pi/2)^2}, \quad (2)$$

where $q_m$ is a geometrical factor, $$q_m = \cos\theta_0 + \cos\theta_m \quad (3)$$

$$= 1 + \sqrt{1-(m\lambda/\Lambda)^2} \text{ for normal incidence}(\theta_0 = 0).$$

For normally incident illumination, the maximum efficiency in the first (m=1) order occurs when the grating depth d=$\lambda$/4. Such a grating has equal diffraction efficiencies into the +1 and −1 orders of approximately 40% for the gratings of interest ($\lambda/\Lambda \leq 0.5$), while the remaining light is diffracted into higher odd orders (i.e. ±3, ±5, etc.).

Figure 2:
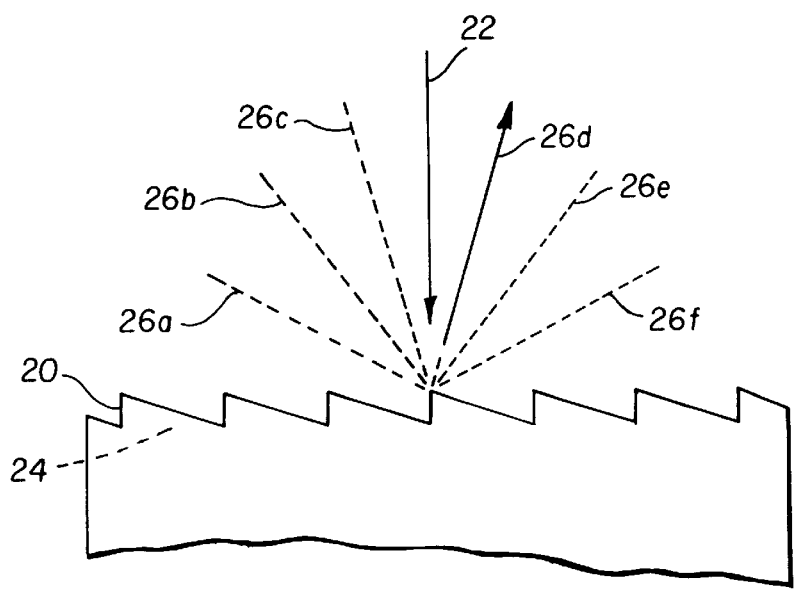
FIG. 2 is an illustration of diffraction from a blazed reflective grating.

For applications requiring a high optical throughput, the grating is desired to diffract with a very high efficiency into a single optical beam. It is well know to one skilled in the art that this is best accomplished by shaping the grating profile with a blaze, see C. Palmer, ed., *Diffraction Grating Handbook*, $2^{nd}$ ed., (Milton Roy Instruments, Rochester, N.Y., 1993). FIG. 2 illustrates the continuous blazed grating profile 20 with a beam 22 incident on the plane of the grating surface 24 to produce diffracted beams 26a, 26b, 26c, 26d, 26e, 26f associated with the non-zero orders of diffraction. By proper design of the grating profile the intensity of the beam in the +1 diffracted order 26d is maximized.

Figure 3:
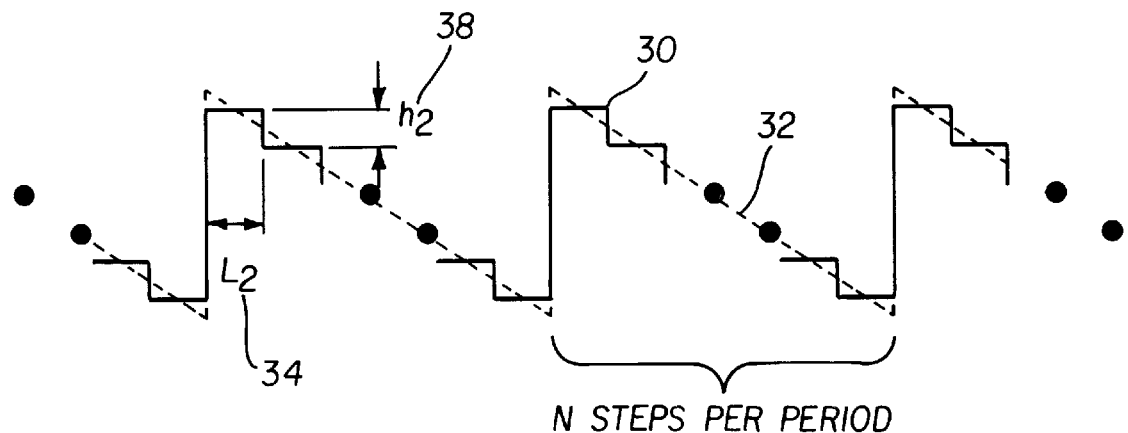
FIG. 3 is an illustration of a multi-level diffraction grating to approximate a blazed grating.

The preferred methods of fabricating a grating device do not allow the grating profile illustrated in FIG. 2. FIG. 3 is an illustration of the grating profile that would be produced using microelectronic fabrication techniques to approximate the blaze with discrete steps wherein each step represents a separate level. The grating profile 30 is a multilevel step grating that approximates a continuous blazed grating profile 32 having a width $L_2$ 34 and a height of separation $h_2$ 38. Equation 4 is the scalar diffraction theory expression for the efficiency of diffraction. The number of discrete steps N within this expression defines the grating profile 30. For the GLV device, the value of the integer N is selected based on the period of the grating profile and the selected width $L_2$ 34 of the ribbon. The value of $L_2$ 34 is chosen to achieve the required diffraction efficiency, but is limited to a minimum by the available fabrication methods. The value for the height $h_2$ 38 is optimized for maximum intensity in the +1 diffracted optical beam according to the expression $h_2=\lambda/2N+p\lambda/2$ where p is zero or a positive integer.

The diffraction efficiency $\eta_m$ into the $m^{th}$ order for a grating with N steps tuned to the +1 order is predicted via scalar theory to be, $$\eta_m = \frac{R}{N^2}\left|\sum_{l=0}^{N-1} e^{i\frac{\pi l}{N}(q_m - 2m)}\right|^2 \frac{\sin^2(m\pi/N)}{(m\pi/N)^2}. \quad (4)$$

As an example of using these relationships, Table 1 shows the diffraction efficiency into the −3 through +3 orders for gratings with differing discrete steps N and R (reflectivity) equal to 1.0. With the addition of a third discrete step, the grating profile becomes asymmetric and the intensity in the +1 diffracted beams 26d is increased by 70% over the power obtained for a grating profile having a square wave profile, N=2. The improvement in diffraction efficiency increases with an increasing number of step levels N.

TABLE 1

| N | $\eta_{-3}$ | $\eta_{-2}$ | $\eta_{-1}$ | $\eta_0$ | $\eta_1$ | $\eta_2$ | $\eta_3$ |
|---|---|---|---|---|---|---|---|
| 2 | 0.045 | 0 | 0.405 | 0 | 0.405 | 0 | 0.045 |
| 3 | 0 | 0.171 | 0 | 0 | 0.684 | 0 | 0 |
| 4 | 0.090 | 0 | 0 | 0 | 0.811 | 0 | 0 |
| 5 | 0 | 0 | 0 | 0 | 0.875 | 0 | 0 |

For the application of the device described here to printing by photosensitive media or thermal sensitive methods, the efficiency should be maximized to allow faster rates of printing while reducing the power requirements of the optical sources providing the incident illumination. For display and other applications, increased efficiency is also advantageous. Ideally, the continuous blaze grating profile could be used to maximize the efficiency of a single diffracted order. Because of the fabrication methods chosen, the alternative of using multiple step levels is desirable. FIG. 3 illustrates a grating profile that can be produced using the standard fabrication processes of microelectronic devices.

Figure 4:
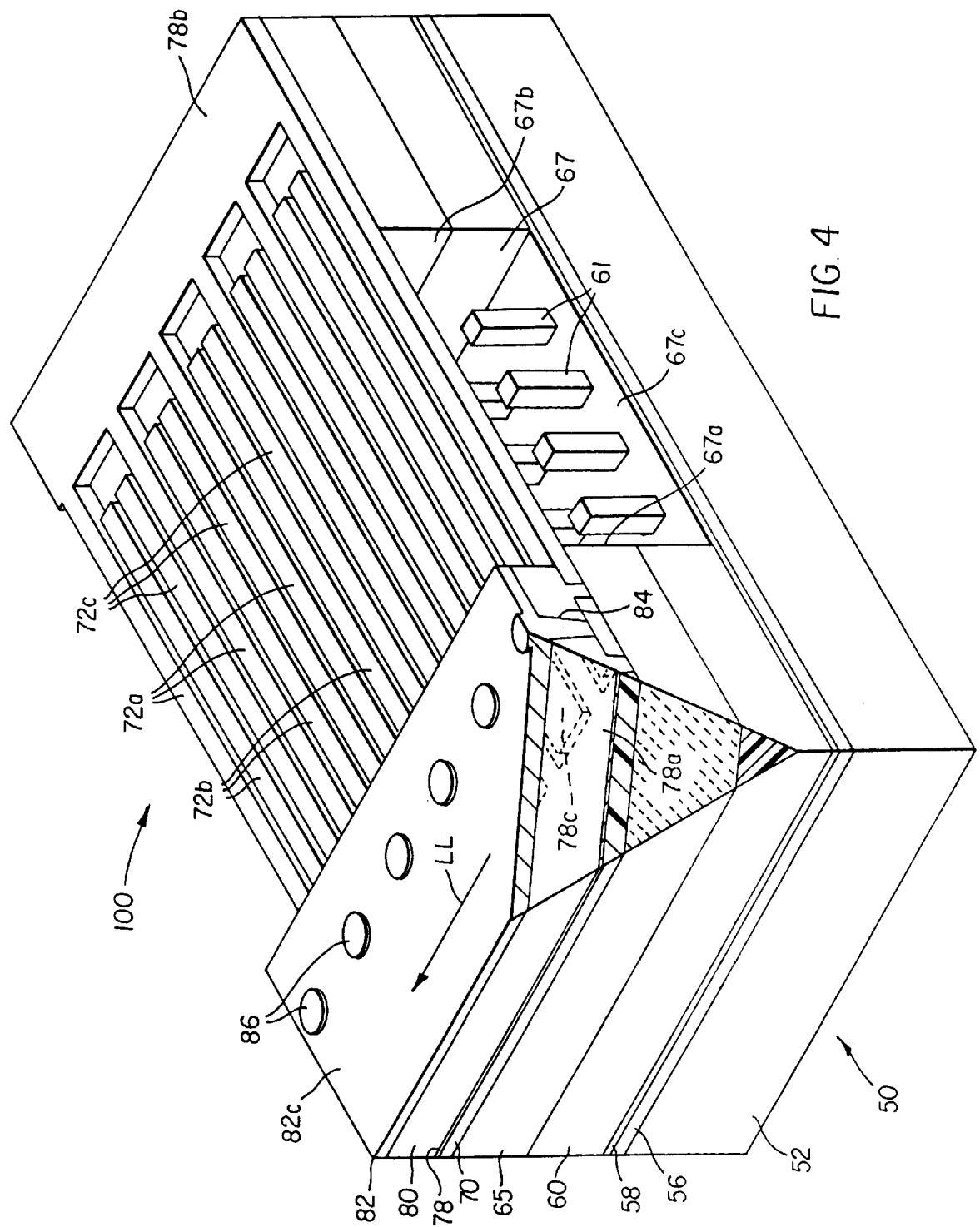
FIG. 4 is a perspective, partially cut-away view of the multilevel mechanical grating device of the present invention.

Referring now to FIG. 4 which illustrates a perspective, partially cut-away view of the multilevel electro-mechanical grating device 100 of the present invention. The multilevel electro-mechanical grating device 100 disclosed therein can form at least three different levels. The mechanically deformable structures are formed on top of a base 50. The present embodiment as shown in FIG. 4 discloses a device 100 that can be operated by the application of an electrostatic force. Because the actuation force of the multilevel electro-mechanical grating device 100 is electrostatic, the base 50 comprises several layers of different materials. The base 50 comprises a substrate 52, chosen from the materials glass and silicon, which is covered by a bottom conductive layer 56. In this embodiment the thin bottom conductive layer 56 is necessary since it acts as an electrode for applying the voltage to actuate the electro-mechanical grating device 100. The thin bottom conductive layer 56 is covered by a protective layer 58. The bottom conductive layer 56 is selected from the group consisting of aluminum, titanium, gold, silver, tungsten, silicon alloys and indium tin oxide. Above the protective layer 58 a standoff layer 60 is formed which is followed by a spacer layer 65. On top of the spacer layer 65, a ribbon layer 70 is formed which is covered by a reflective layer 78. In the present embodiment the reflective layer 78 also has to include a conductor in order to provide electrodes for the actuation of the multilevel electro-mechanical grating device 100. The electrodes are patterned from the reflective and conductive layer 78. The ribbon layer 70 comprises a material with a suitably large tensile intrinsic stress such that the ribbons remain taut when no actuation force is applied. Examples of ribbon materials are silicon nitride, titanium aluminide, and titanium oxide. The thickness and tensile stress of the ribbon layer 70 are chosen to optimize performance by influencing the electrostatic or mechanic force required for actuation and the returning force, which affect the speed, resonance frequency, and voltage requirements of the multi-level mechanical grating device 100.

The spacer layer 65 has a longitudinal channel 67 formed therein. The longitudinal channel 67 extends along a longitudinal direction L—L of the multilevel electro-mechanical grating device 100. The longitudinal channel 67 comprises a first and second side wall 67a and 67b and a bottom 67c. The channel 67 is open to the top and covered by a first, a second and a third set of deformable ribbon elements 72a, 72b and 72c. Each deformable ribbon element 72a, 72b and 72c spans the channel 67 and is secured to the surface of the spacer layer 65 on either side of the channel 67. The bottom 67c of the channel 67 is covered by the protective layer 58. As mentioned above, the ribbon layer 70 is covered by the reflective layer 78. The reflective layer 78, which can be conductive as well, is patterned such that there are first and second conducting regions 78a and 78b, which form comb-like structures arranged on the surface in an interdigitated manner. A third conducting region 78c is also created in the patterning of the reflective layer 78. This is electrically connected to an electrical interconnect 82, through an array of via openings 84 in an isolation layer 80, which are filled with conducting material 86. The first, second and third conductive regions 78a, 78b and 78c are mechanically and electrically isolated from one another. According to the pattern of the reflective layer 78, the ribbon layer 70 is patterned to form first, second and third sets of deformable ribbon elements 72a, 72b and 72cspanning the channel 67. The first, second and third conducting regions 78a, 78b and 78c are electrically and mechanically isolated from one another, allowing separate application of actuation voltages to the first, second and third sets of ribbon elements 72a, 72b and 72c. The deformable ribbon elements 72a, 72b and 72care grouped according to the longitudinal direction L—L of the channel 67. In the case of the three level electro-mechanical grating device 100 (embodiment as disclosed in FIG. 4), three deformable ribbon elements belong to one group.

In the embodiment shown in FIG. 4, a plurality of standoffs 61 is positioned on the bottom 67c of the channel 67. The standoffs 61 are patterned from the standoff layer such that one standoff 61 is associated with one deformable ribbon element of each group. Furthermore, the standoffs are equidistantly spaced. In the embodiment shown here each group comprises of a first, second and third ribbon element $73_{L3}1$, $72_{L3}2$, and $72_{L3}3$. The standoffs 61 are associated with the second ribbon element $72_{L3}2$ of each group (valid for three ribbon elements per group). The standoffs 61 may also be patterned in the form of a single bar.

Figure 5:
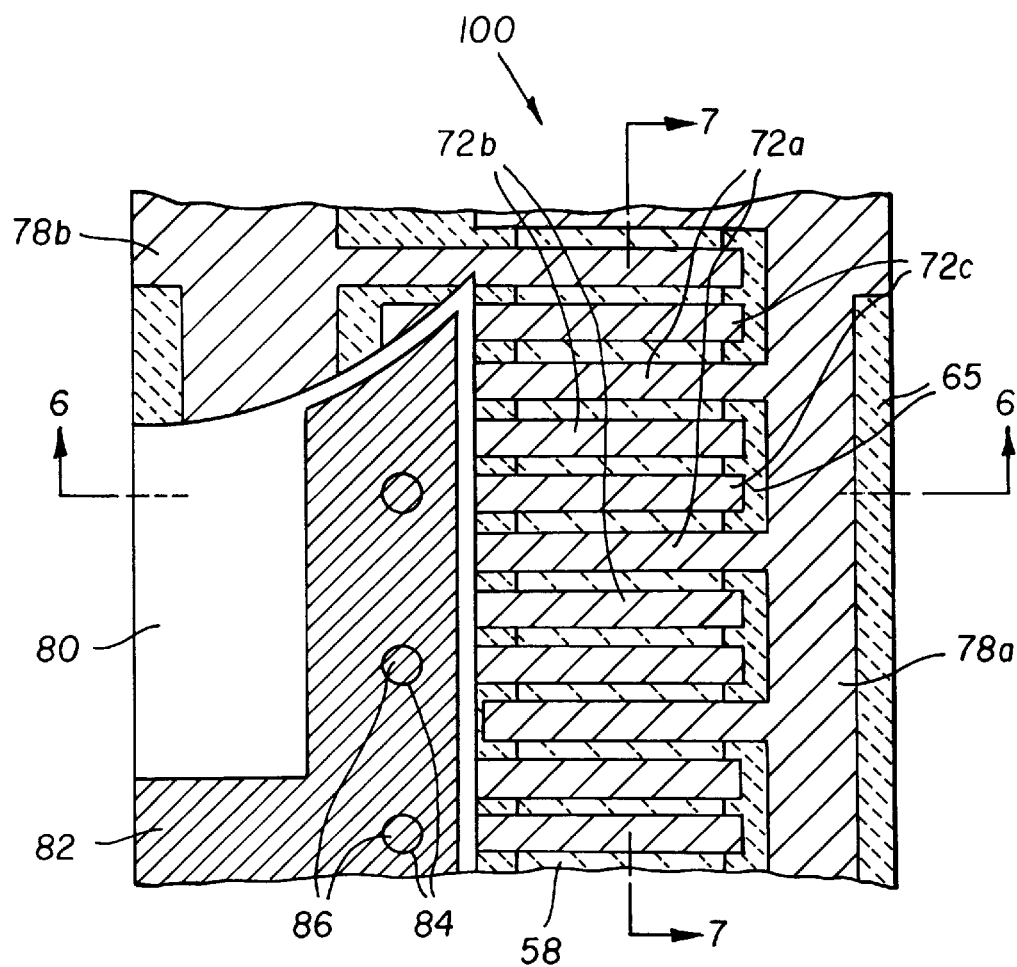
FIG. 5 is a top view of the multilevel mechanical grating device of the present invention.

A top view of the multilevel electro-mechanical grating device 100 with three levels is illustrated in FIG. 5, which also shows two planes perpendicular to the view illustrated. View Plane 6—6 is a side view of the multilevel mechanical grating device 100 and depicts the view shown in FIG. 6. View Plane 7—7 is a side view of the device and depicts the view shown in FIG. 7. Note that a device with four or more levels (four or more deformable ribbon elements per group) is a straightforward extension of the principles illustrated in FIGS. 5, 6 and 7. The mechanical grating device 100, as shown in FIG. 5, is a device which can be actuated by the application of an electrostatic force.

Regardless how many ribbon elements belong to a group, there is a general rule for the electrical connection of the ribbon elements from different groups. Every $j^{th}$ element of a group is electrically connected to the $j^{th}$ element of all the other groups.

Figure 6:
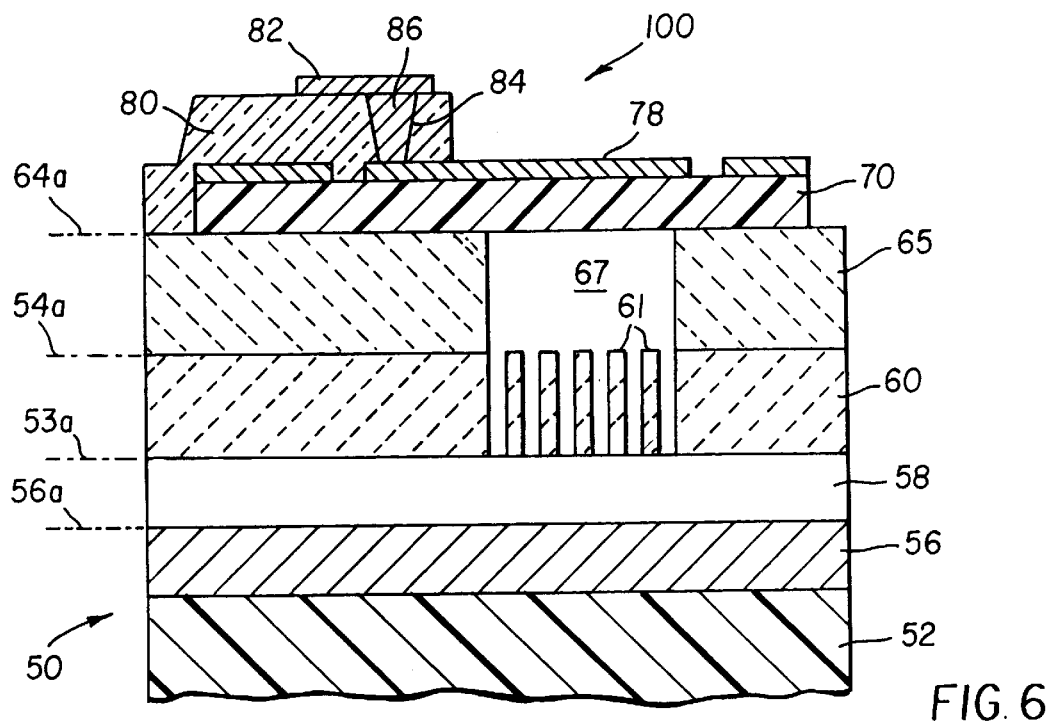
FIG. 6 is a cross-sectional view along plane 6—6 indicated in FIG. 5 to illustrate the layered structure of one embodiment of the invention.

The GLV described in FIGS. 5 and 6 incorporates multiple levels, which means more than two, to discretely approximate a blazed grating. By controlling which ribbons are actuated, the intermediate levels can be used to approximate blazed gratings for either the +1 or the −1 diffracted order. Furthermore, by not actuating any of the ribbons, the device acts as a reflective plane, reflecting light into the 0 order. Thus, light can be directed independently into three different angles, depending on which ribbons, if any, are actuated.

Figure 7:
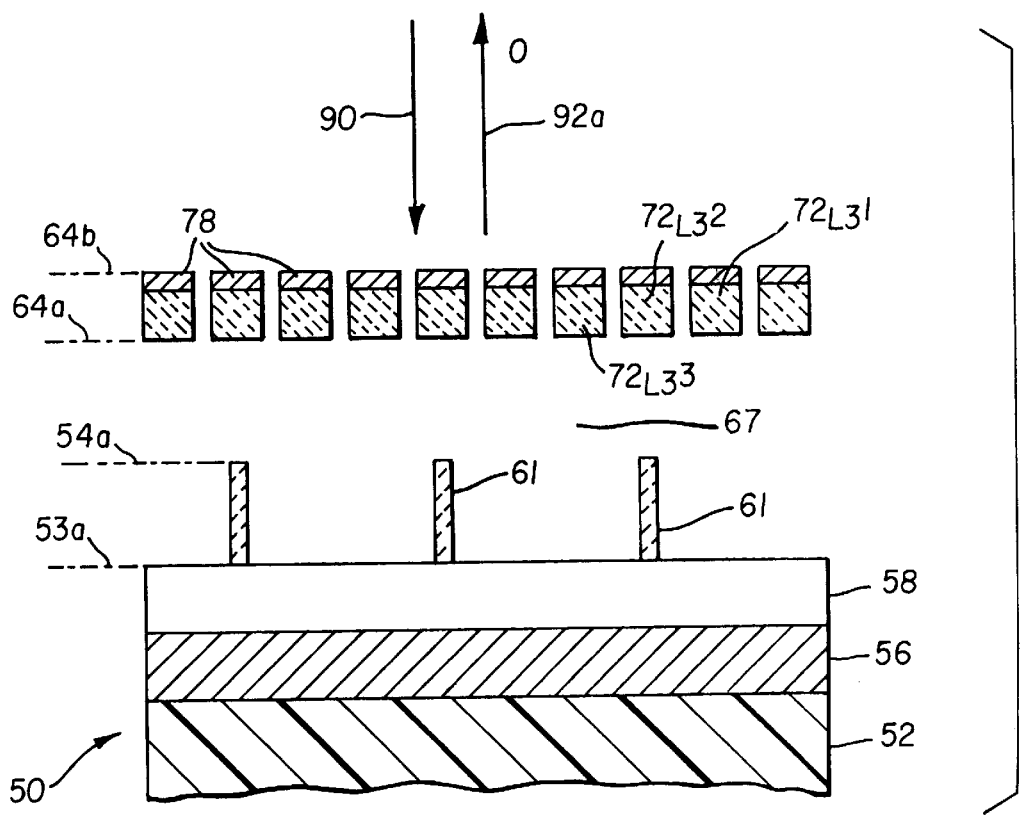
FIG. 7 is a cross-sectional view along plane 7—7 indicated in FIG. 5 to illustrate the concept with three levels per group in the unactuated state.
Figure 8:
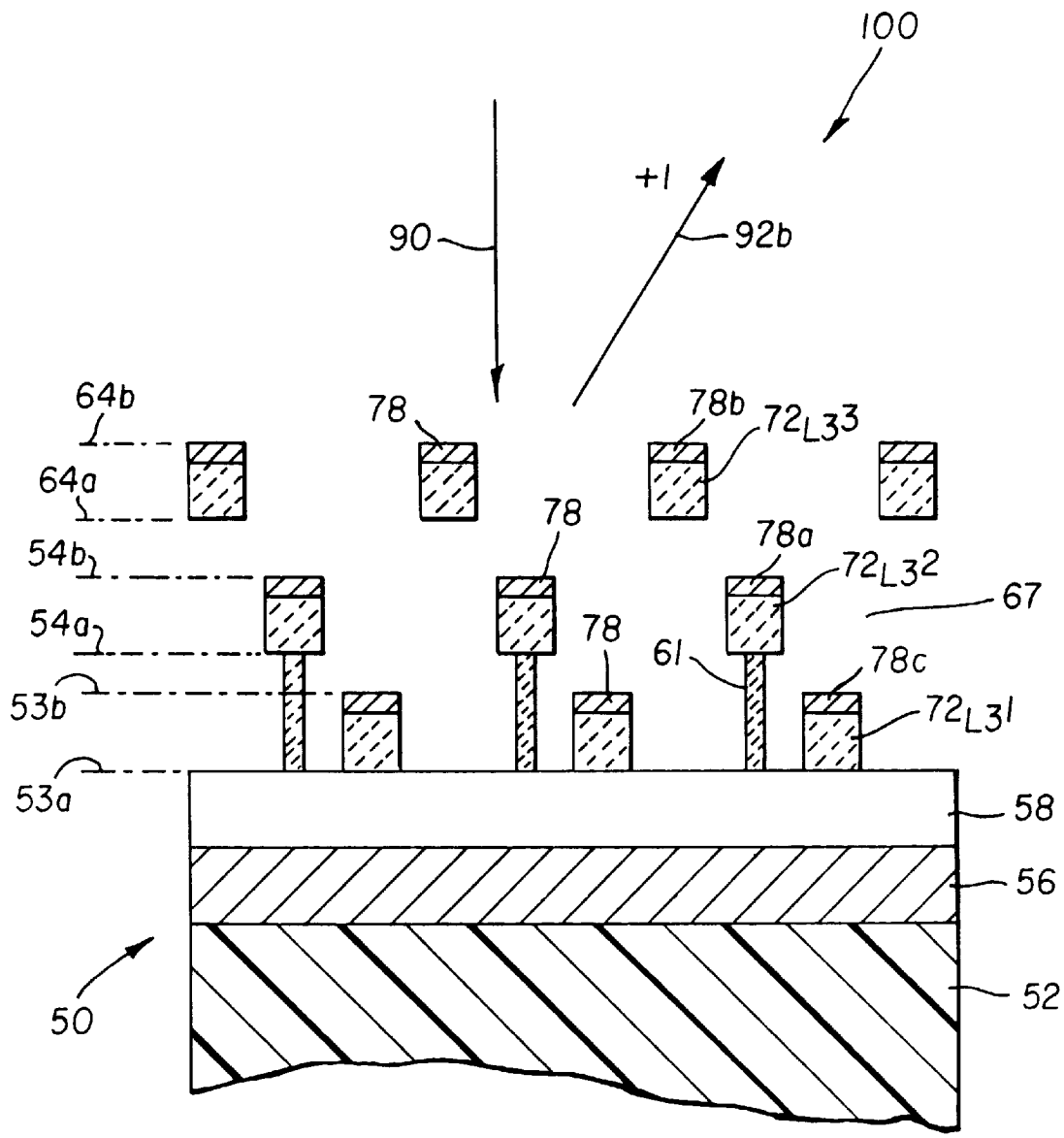
FIG. 8 is a cross-sectional view along plane 7—7 indicated in FIG. 5 to illustrate the concept with three levels per group in the first actuated state.
Figure 9:
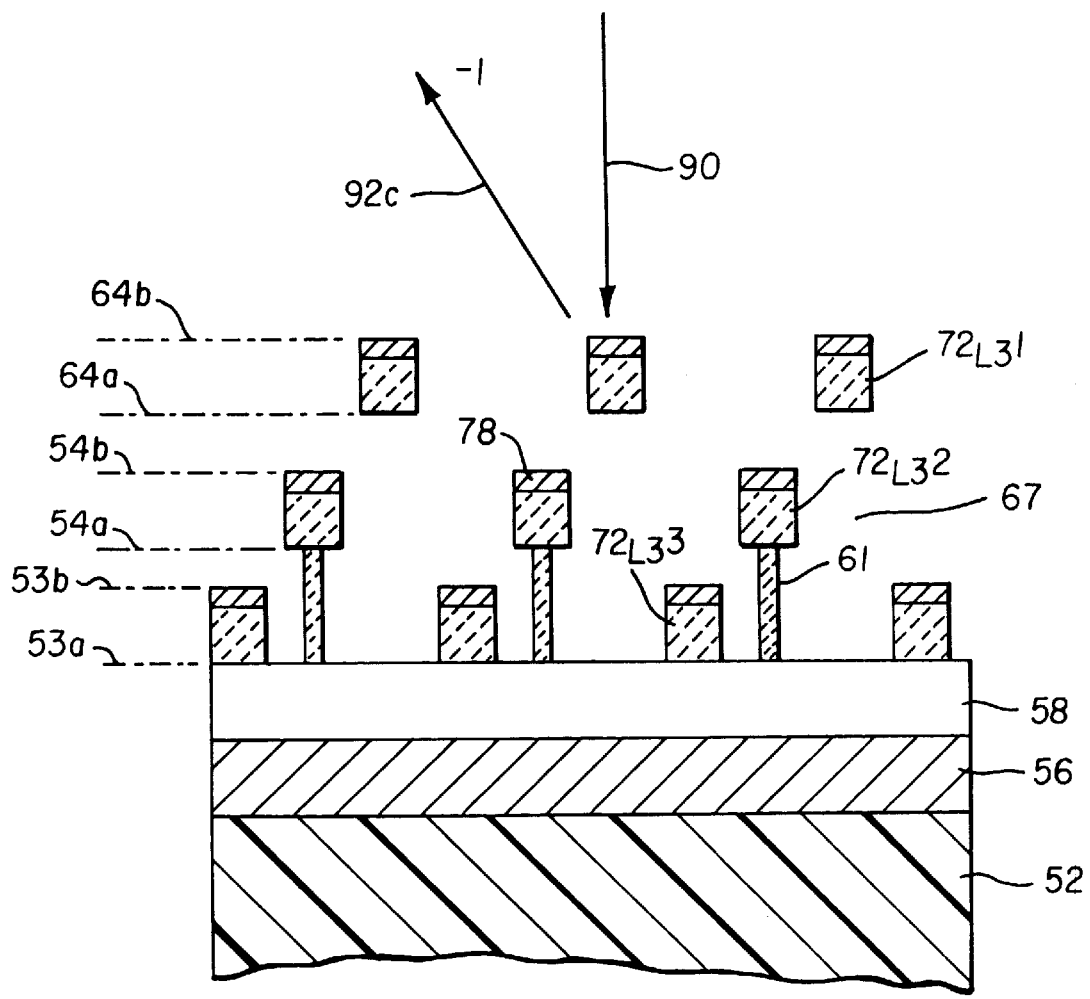
FIG. 9 is a cross-sectional view along plane 7—7 indicated in FIG. 5 to illustrate the concept with three levels per group in the second actuated state.
Figure 10:
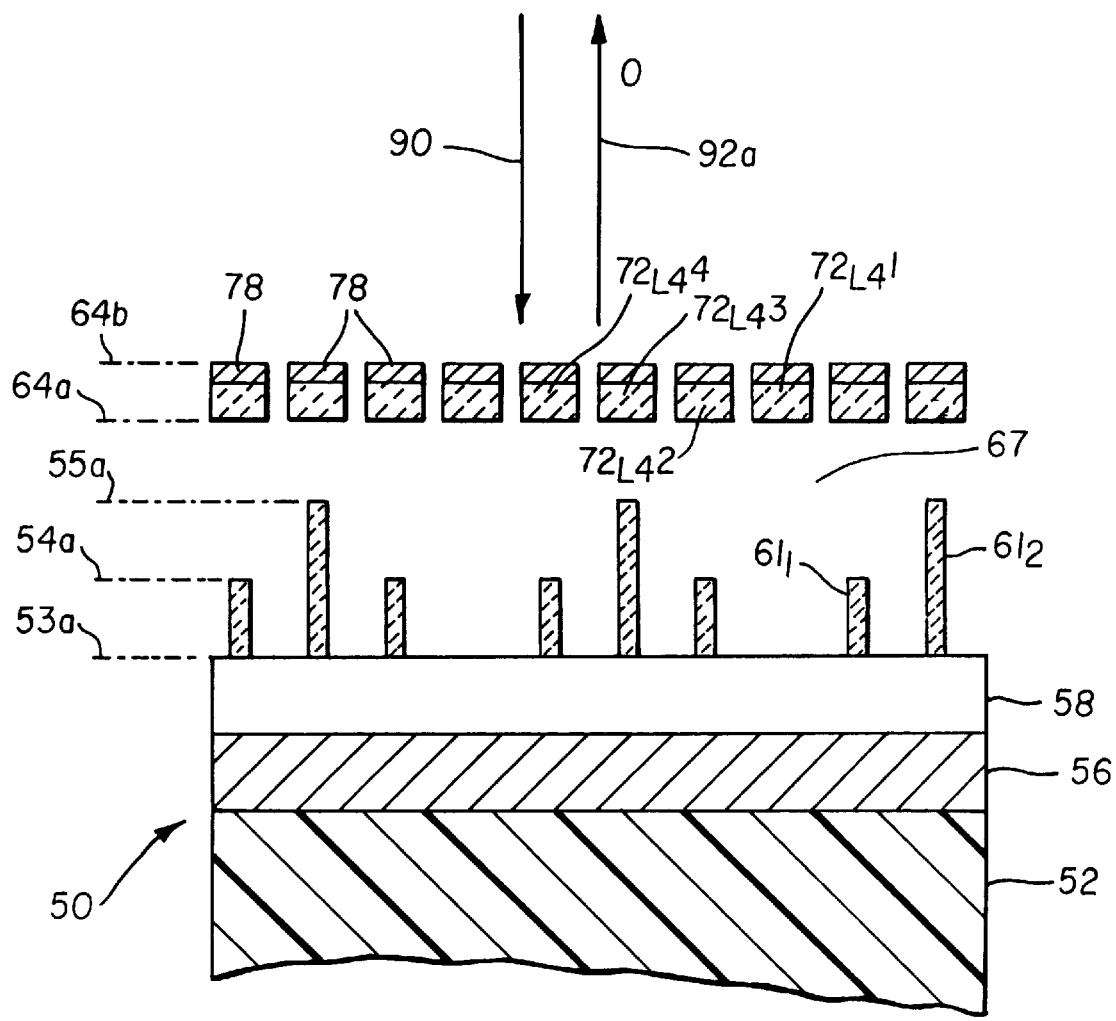
FIG. 10 is a cross-sectional view along plane 7—7 indicated in FIG. 5 to illustrate the concept with four levels per group in the unactuated state.
Figure 11:
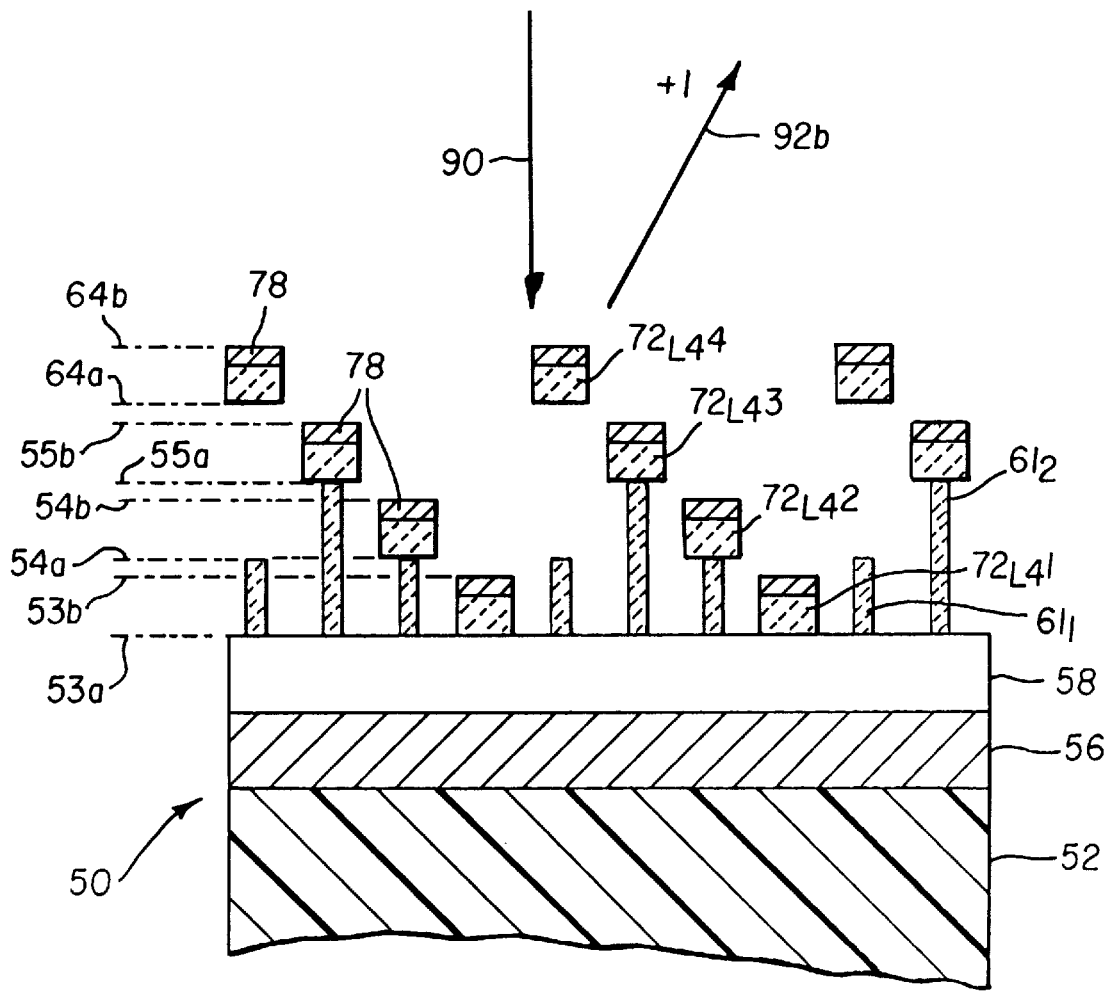
FIG. 11 is a cross-sectional view along plane 7—7 indicated in FIG. 5 to illustrate the concept with four levels per group in the first actuated state.
Figure 12:
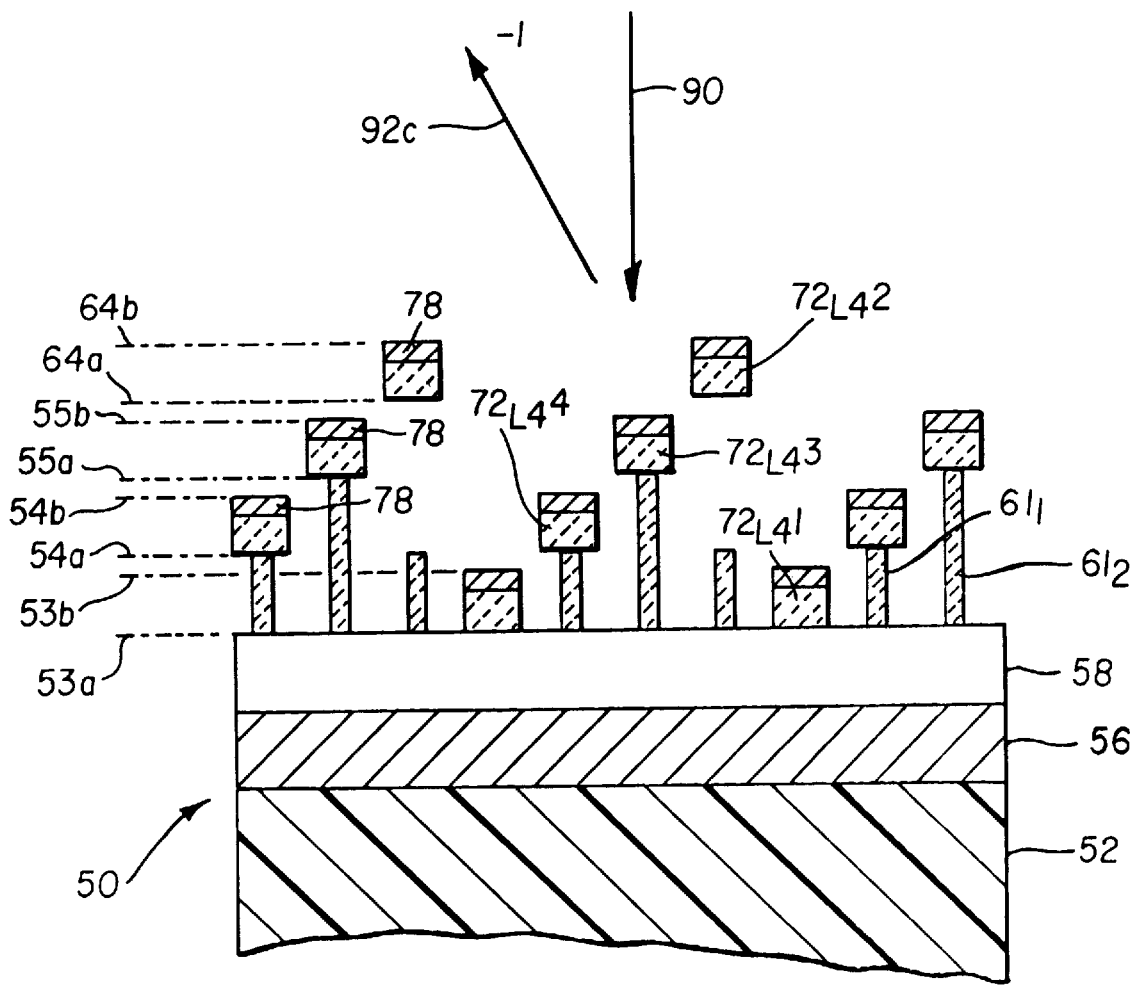
FIG. 12 is a cross-sectional view along plane 7—7 indicated in FIG. 5 to illustrate the concept with four levels per group in the second actuated state.

FIGS. 7, 8 and 9 illustrate this concept with three levels per group which means a first, a second and a third ribbon element $72_{L3}1$, $72_{L3}2$ and $72_{L3}3$ per group, and FIGS. 10, 11 and 12 illustrate the concept with four levels per group which means a first, a second, a third and a fourth ribbon element $72_{L4}1$, $72_{L4}2$ $72_{L4}3$ and $72_{L4}4$ per group. In FIG. 7, the surface 53a of the base 50 is shown with the standoffs 61 (pedestals or lines) designed with specific heights as defined by the relationship between the height $h_2$ 34 and the number of ribbons per period N. For this case, the value of N is three for each period Λ, and only one intermediate level 54a exists. The intermediate level 54a defined by the upper surface 54a of the standoffs 61 and should be λ/6 above the surface 53a of the base 50 to maximize the efficiency of diffraction into the +1 or −1 order.

The state of the GLV illustrated in FIG. 7 is achieved by not actuating any of the sets of ribbon elements 72a, 72b, or 72c. The result is nearly a planar mirrorlike surface, with an incident beam 90 being efficiently reflected into a zero order output beam 92a with no diffraction into the ±1 orders. FIG. 8 illustrates the state of the GLV that efficiently diffracts an incident beam 90 into a +1 order diffracted output beam 92b, with no light diffracted into the 0 or −1 orders. This is accomplished by actuating the first and second ribbon element $72_{L3}1$ and $72_{L3}2$. According to the actuation, the levels 64b, 54b and 53b are generated. The spacings between levels 64b, and 54b, and 54b and 53b, should both be equal to the height of the standoff 61, which should be λ/6 for optimum performance. FIG. 9 illustrates the state of the GLV that efficiently diffracts an incident beam 90 into a −1 order diffracted output beam 92c, with no light diffracted into the 0 or +1 orders. This is accomplished by actuating the second and third ribbon elements $72_{L3}2$ and $72_{L3}3$. In the present case, the switching from the +1 order diffraction to the −1 order diffraction can be accomplished by turning off the voltage applied to the first ribbon element $72_{L3}1$ per group, by leaving on the voltage applied to the second ribbon element $72_{L3}2$ per group and by applying a voltage to the third ribbon element $72_{L3}3$ per group.

FIGS. 10, 11 and 12 are comparable to FIGS. 7, 8 and 9, except that four ribbons belong to one group. A first set of standoffs $61_1$ defines intermediate levels 54a and a second set of standoffs $61_2$ defines the intermediate levels 55a. Intermediate levels 54a and 55a are spaced by $h_2$ 38. In FIG. 11, the first, second and third ribbon elements $72_{74}1$, $72_{L4}2$ and $72_{L_4}3$ of each group are actuated such that their top surfaces are level with 53b, 54b and 55b respectively. In FIG. 12 the first, third and fourth ribbon elements $72_{L_4}1$, $72_{L_4}3$ and $72_{L_4}4$ of each group are actuated such that their top surfaces are level with 53b, 55b and 54b respectively. As illustrated in FIGS. 11 and 12 a switching between the +1 order diffraction and the −1 order diffraction is simply caused by turning off the voltage applied to the second ribbon element $72_{L_4}2$ of each group and turning on the voltage applied to the fourth ribbon element $72_{L_4}4$ of each group, while continuously applying voltage to the first and third ribbon elements $72_{L_4}1$ and $72_{L_4}3$ of each group.

In FIGS. 10, 11 and 12, in which N=4, the lower standoff level 54a of the first set of standoffs $61_1$ is $\lambda/8$ above the substrate surface 53a, and the upper level 55a of the second set of standoffs $61_2$ is $\lambda/4$ above the substrate level 53a. Thus, the total depth of the channel 67, defined as the separation of levels 64a and 53a, is equal to $3\lambda/8$. In general, the total depth of the channel 67 should be $(1-1/N)\lambda/2$.

There are three methods of using the GLV presented herein in a system design. One method is to increase the contrast of the modulator by switching between the +1 order configuration shown in FIGS. 8 and 11, and the −1 order configuration shown in FIGS. 9 and 12. The second method is to relax the fabrication difficulties by producing larger pitch gratings that switch between the +1 order and −1 order configurations. The last method is to utilize all three configurations, the 0 order configuration illustrated in FIGS. 7 and 10, and the +1 order and −1 order configurations, to produce a three-way light valve.

The first method utilizes the fact that light collected from the GLV modulator must be filtered to remove the light coming from the unactuated grating elements. This is typically accomplished by placing a slit (not shown) in the farfield or the focal plane of an imaging lens (not shown). However, it is well known to one skilled in the art that placing a slit in the focal plane of an imaging lens will result in a loss of fidelity of the image. Thus, in order to accurately image the GLV array with high fidelity, the slit must have a minimum width. In a conventional GLV modulator though, the light from the unactuated grating elements in the 0 diffracted order may not be sufficiently separated in angle from the desired +1 diffracted order. The consequence is that a portion of the unwanted light can pass through the spatial filter, thereby reducing the contrast of the modulator (defined as the ratio of the intensity from a grating element in its actuated state to that in its unactuated state).

The first method of this invention, modulating by switching between the +1 diffraction order configuration and the −1 diffraction order configuration, presents an improvement to this problem. By switching between these two non-zero diffracted orders, the angular separation between the desired and undesired output beams is doubled as compared to the conventional mode of operation. The result is that substantially less unwanted light can pass through a spatial filter with the necessary dimensions for image fidelity. Thus, the contrast can be improved, both by the higher efficiency of diffraction of the desired light due to the multilevel grating configuration, and by the reduction in unwanted light by increased angular separation.

The second method presented is a means of using the larger angular separation to relax the fabrication difficulties by designing multilevel gratings with larger pitches. If the grating pitch is desired to be kept constant, increasing the number of ribbons N per grating period leads to increased difficulty in the photolithography steps. Specifically, the width of the gaps between ribbons (typically near the resolution limit of the photolithography process) becomes a more significant fraction of the ribbon width as a larger number of ribbons is formed within the same grating period. This can lead to a reduction in diffraction efficiency. One can compensate for this by increasing the grating pitch (to keep the ribbon widths constant), but this would reduce the contrast of a modulator used in the conventional manner due to the decreased angular separation of the $0^{th}$ order and $1^{st}$ order diffracted beams.

Figure 13:
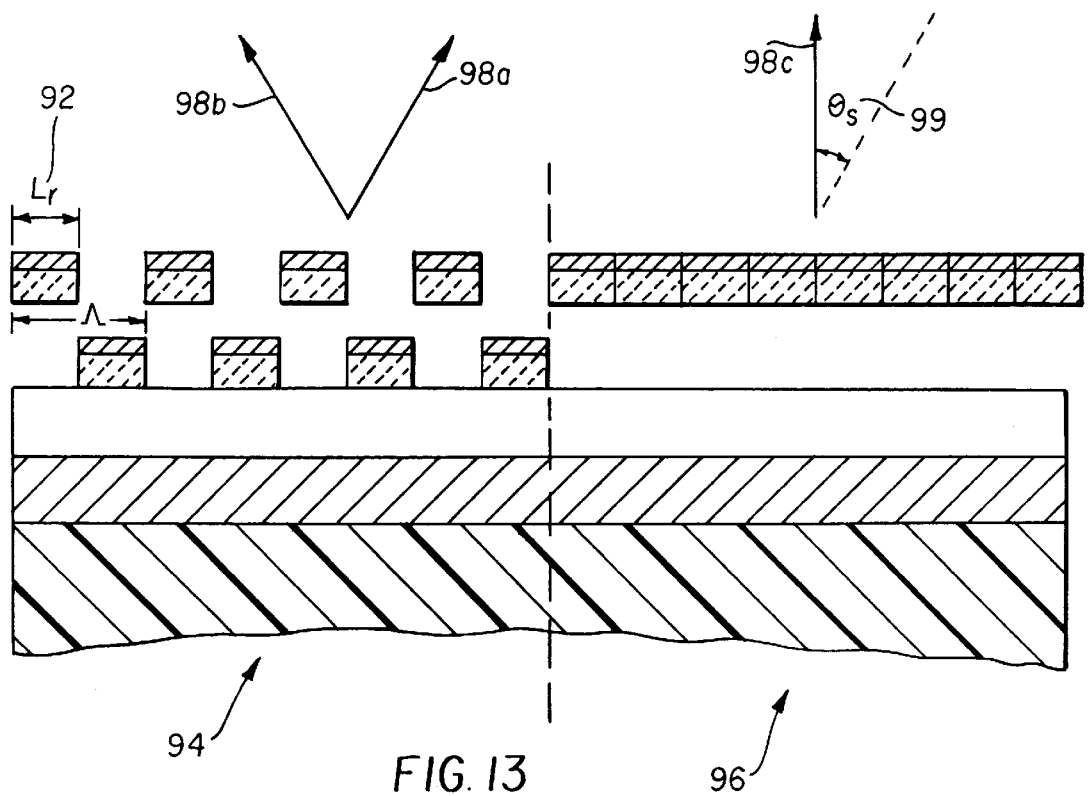
Figure 14:
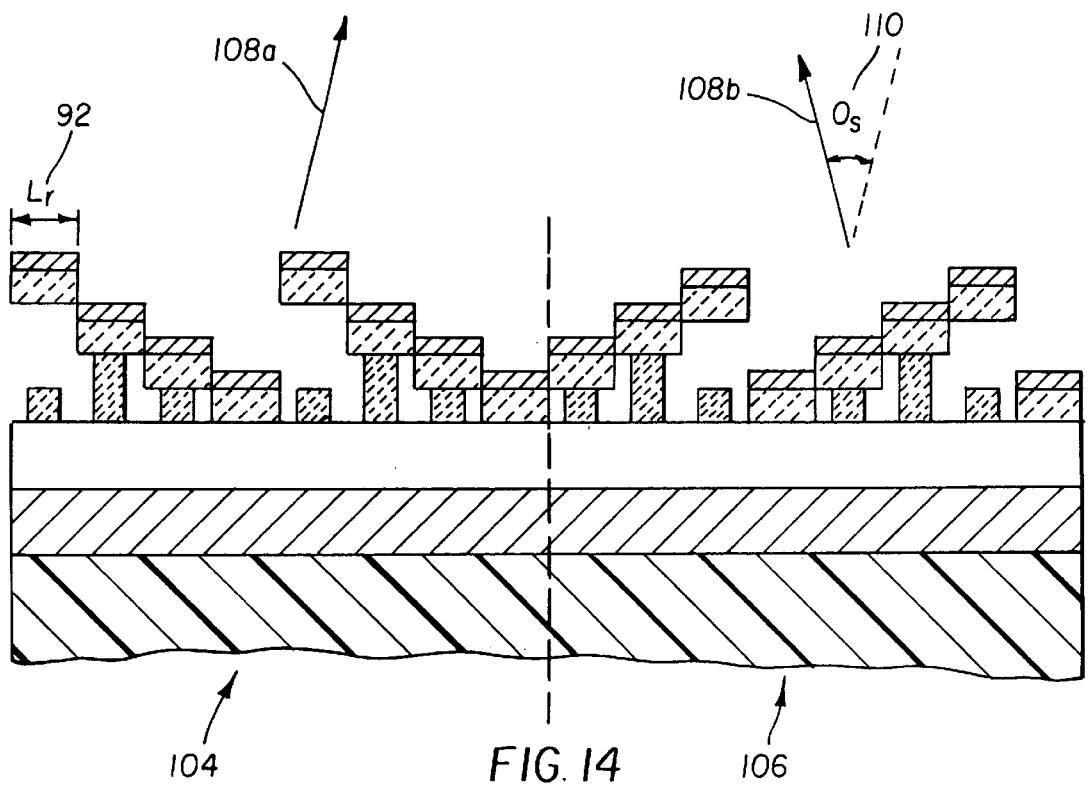

However, by using the method of modulating by switching between the −1 and +1 diffracted orders, a multilevel grating modulator can be designed with the same angular separation of the wanted and unwanted optical beams but nearly double the grating pitch of a grating modulator operated in the conventional manner. As an example, FIGS. 13 and 14 each illustrate two elements, one turned off and the other on, of two different grating modulators. FIG. 13 shows a bi-level grating 90 consisting of ribbons of width $L_r$ 92 to form a grating with pitch $\Lambda=2_r$ (ignoring gaps between ribbons). An optical beam normally incident on the "on" grating element 94 diffracts into both the +1 98a and −1 98b orders, although only one order is conveniently collected. An optical beam normally incident on the "off" grating element 96 is reflected into the 0 order 98c. The angular separation between the "on" diffracted beams (98a and/or 98b) and the "off" diffracted beam 98c is $\theta_s$ 99. FIG. 14 shows two elements from a 4-level grating modulator 102 with intermediate levels defined according to the same methods used in device 49a illustrated in FIG. 10. The device in FIG. 14 consists of ribbons of the same width $L_r$ 92 to form a grating with pitch $\Lambda=4L_r$, or twice the pitch of the bi-level grating in FIG. 13. An optical beam normally incident on the "on" grating element 104 efficiently diffracts only into the +1 order 108a. An optical beam normally incident on the "off" grating element 106 efficiently diffracts only into the −1 order 108b. The resulting angular separation 110 is substantially the same angular separation 100 from the bi-level grating in FIG. 13. Thus, the grating modulator in FIG. 14 will provide nearly the same angular separation of the "on" and "off" output beams as the modulator in FIG. 13, while approximately doubling the efficiency of diffraction.

The last application of this invention is to use all three independent outputs to form a three-way light valve. For printing and display applications, it would be desirable to have two independent outputs that are equivalent in efficiency and contrast. Such a device would be useful, for example, in a system equipped with an auxiliary optical system, e.g. to monitor device performance. The system could be arranged with the +1 output beam being directed to the target (screen or printing medium), and the −1 order output beam being directed to the auxiliary optical system. While in principle this could be accomplished with a conventional bi-level grating light valve, light cannot be switched independently into either the +1 or −1 order diffracted beam in that configuration. Thus, to selectively illuminate either the target or the auxiliary optical system with a bi-level grating element would complicate the system. The light valve presented herein, which independently switches into either the +1 order diffracted beam or the −1 order diffracted beam, would simplify the system significantly.

The invention has been described in detail with particular reference to certain preferred embodiments thereof, but it will be understood that variations and modifications can be effected within the spirit and scope of the invention.

| PARTS LIST | |
|---|---|
| 10 | reflective grating |
| 11 | angle $\theta_0$ |
| 12 | optical beam |
| 13 | period $\Lambda$ |
| 14 | width of the groove $L_1$ |
| 15 | angle $\theta_m$ |
| 16 | diffracted beam |
| 20 | blazed grating |
| 22 | incident beam |
| 24 | grating surface |
| 26a to 26f | diffracted beams |
| 30 | grating profile |
| 32 | continuous blazed grating profile |
| 34 | width $L_2$ |
| 38 | a height of separation $h_2$ |
| 50 | base |
| 52 | substrate |
| 53 | surface of the base |
| 53a | surface |
| 53b | level |
| 54a | top surface of standoffs |
| 54b | second intermediate top level |
| 55a | surface |
| 55b | first intermediate top level |
| 56 | bottom conductive layer |
| 56a | surface of the bottom conductive layer |
| 58 | protective layer |
| 60 | standoff layer |
| 61 | standoff |
| $61_1$ | first set of standoffs |
| $61_2$ | second set of standoffs |
| 64a | first bottom level |
| 64b | first top level |
| 65 | spacer layer |
| 67 | channel |
| 67a | first side wall of the channel |
| 67b | second side wall of the channel |
| 67c | bottom of the channel |
| 70 | ribbon layer |
| 70a | bottom surface of the coplanar ribbon elements |
| 70b | top surface of the coplanar ribbon elements |
| 72a | first set of deformable ribbon elements |
| 72b | second set of deformable ribbon elements |
| 72c | third set of deformable ribbon elements |
| $72_{L_3}1$ | first element of each group of three |
| $72_{L_3}2$ | second element of each group of three |
| $72_{L_3}3$ | third element of each group of three |
| $72_{L_4}1$ | first element of each group of four |
| $72_{L_4}2$ | second element of each group of four |
| $72_{L_4}3$ | third element of each group of four |
| $72_{L_4}4$ | fourth ribbon element of each group of four |
| 78 | first conductive layer |
| 78a | first conducting region |
| 78b | second conducting region |
| 78c | third conducting region |
| 80 | isolation layer |
| 82 | electrical interconnect |
| 84 | via opening |
| 86 | conducting material |
| 90 | bi-level grating |
| 92 | width $L_r$ of ribbons |
| 92b | diffracted beam |
| 94 | "on" bi-level grating element |
| 96 | "off" bi-level grating element |
| 98a | diffraction into the +1 order |
| 98b | diffraction into the −1 order |
| 98c | diffraction into the 0 order |
| 99 | $\theta_s$ angular separation |
| 100 | multilevel electro-mechanical grating device |
| 104 | "on" grating element (four level) |
| 106 | "off" grating element (four level) |
| 108a | diffraction into the +1 order |
| 108b | diffraction into the −1 order |
| 110 | $\theta_s$ angular separation |
| L | longitudinal direction |
| N | number of discrete steps |
| d | grating depth |
| m | order |
| n | number of levels |
| $\Lambda$ | pitch |
| $\eta_m$ | diffraction efficiency |
| 6-6 | view plane |
| 7-7 | view plane |
| L-L | longitudinal direction of the device |
| O-O | orthogonal axis |

What is claimed is:

1. A method for operating a mechanical grating device having a plurality of spaced apart deformable ribbon elements disposed parallel to each other in the unactuated state and spanning a channel, wherein the ribbon elements define a top surface and each ribbon element defines a discrete level, said deformable ribbon elements are organized in groups of N elements wherein N is greater than 2, the method comprising the steps of:

a) providing a beam of light;

b) applying a first actuation force pattern to the ribbon elements of each group for a certain amount of time thereby generating a first pattern in each group wherein the pattern comprises N different levels, wherein the levels of adjacent ribbon elements in each group are separated by $$\frac{\lambda}{2N} + p\frac{\lambda}{2},$$

and diffracting the incident light beam into a first direction; and c) applying a second actuation force pattern to the ribbon elements of each group for a certain amount of time thereby generating a second pattern in each group wherein the second pattern comprises N different levels thereby diffracting the incident light beam into a second direction different from the first direction.

2. The method as defined in claim 1 wherein the second pattern is a mirror image of the first pattern and the mirror plane is defined by an axis of symmetry in each group perpendicular to the top surface of the ribbon elements.

3. The method as defined in claim 1 wherein the levels of successive ribbon elements in each group are separated by a constant amount, thereby representing a staircase of N equal steps.

4. The method as defined in claim 1 comprising the additional step of generating the unactuated state for a certain amount of time before a subsequent actuated state is initiated.

5. A method for operating an electro-mechanical grating device having a plurality of spaced apart deformable ribbon elements disposed parallel to each other in the unactuated state and spanning a channel, wherein the ribbon elements define a top surface and each ribbon element defines a discrete level, said deformable ribbon elements are organized in groups of N elements wherein N is greater than 2 and a plurality of standoffs are provided, wherein according to the longitudinal direction of the device at least N-2 standoffs are associated with each group, the method comprising the steps of:

a) providing a beam of light;

b) applying a first electrostatic actuation force pattern to the ribbon elements of each group for a certain amount of time thereby generating a first pattern in each group wherein the pattern comprises N different levels thereby diffracting the incident light beam into a first direction; and c) applying a second electrostatic actuation force pattern to the ribbon elements of each group for a certain amount of time thereby generating a second pattern in each group wherein the second pattern comprises N different levels thereby diffracting the incident light beam into a second direction different from the first direction.

6. The method as defined in claim 5 wherein the number of elements in each group is three.

7. The method as defined in claim 6 wherein the second pattern is a mirror image of the first pattern and the mirror plane is defined by an axis of symmetry in each group perpendicular to the top surface of the ribbon elements.

8. The method as defined in claim 6 wherein the levels of adjacent ribbon elements in each group are separated by $$\frac{\lambda}{6} + p\frac{\lambda}{2}.$$

9. The method as defined in claim 8 wherein the levels of successive ribbon elements in each group are separated by a constant amount, thereby representing a staircase of 3 equal steps.

10. The method as defined in claim 5 wherein the number of elements in each group is four.

11. The method as defined in claim 10 wherein the top surface of two ribbon elements is movable by $$\frac{\lambda}{4} + p\frac{\lambda}{2}$$

and the top surface of a third element is movable by $$\frac{\lambda}{8} + p\frac{\lambda}{2}$$

and the top surface of the remaining element is movable by $$\frac{3\lambda}{8} + p\frac{\lambda}{2}.$$

12. The method as defined in claim 11 wherein the first pattern is generated by moving the first, second and third ribbon elements with respect to the unactuated state.

13. The method as defined in claim 11 wherein the second pattern is generated by moving the first, third and fourth ribbon elements with respect to the unactuated state.

14. The method as defined in claim 5 comprising the additional step of generating the unactuated state for a certain amount of time before a subsequent actuated state is initiated.

15. An electro-mechanical grating device comprising:

a) a base having a surface;

b) a spacer layer, having an upper surface, is provided above the base, and a longitudinal channel is formed in said spacer layer, said channel having a first and second opposing side wall and a bottom;

c) a first conductive layer being provided below the bottom of the channel;

d) a plurality of spaced apart deformable ribbon elements disposed parallel to each other and spanning the channel, said deformable ribbon elements defining a top and a bottom surface and are fixed to the upper surface of the spacer layer on each side of the channel, said deformable elements are organized in a plurality of groups of N elements wherein N is greater than 2; each of said groups forms a pattern of discrete levels in an actuated state wherein the pattern has N different levels; and e) a second conductive layer being part of each deformable ribbon element, wherein all deformable ribbon elements within each group are electrically isolated from each other, and wherein the $j^{th}$ element in each group is electrically connected to the $j^{th}$ elements in all other groups.

16. An electro-mechanical grating device comprising:

a) a base having a surface;

b) a spacer layer, having an upper surface, is provided above the base, and a longitudinal channel is formed in said spacer layer, said channel having a first and second opposing side wall and a bottom;

c) a first conductive layer being provided below the bottom of the channel;

d) a plurality of spaced apart deformable ribbon elements disposed parallel to each other and spanning the channel, said deformable ribbon elements defining a top and a bottom surface and are fixed to the upper surface of the spacer layer on each side of the channel, said deformable elements are organized in a plurality of groups of N elements wherein N is greater than 2; each of said groups forms a pattern of discrete levels in an actuated state wherein the pattern has N different levels;

e) a second conductive layer being part of each deformable ribbon element, wherein the $j^{th}$ element in each group is electrically connected to the $j^{th}$ elements in all other groups; and f) a plurality of standoffs provided, and according to the longitudinal direction of the device at least N-2 standoffs are associated with each group.

17. The electro-mechanical grating device as defined in claim 16 wherein the standoffs are formed on the bottom of the channel.

18. The electro-mechanical grating device as defined in claim 16 wherein the standoffs are formed on the bottom surface of the ribbon elements.

19. The electro-mechanical grating device as defined in claim 16 wherein according to the width of said device each standoff is divided into a plurality of individual elements of equal height.

20. The electro-mechanical grating device as defined in claim 16 wherein three deformable ribbon elements are within one group, and wherein the standoffs of each group defining a height allowing two ribbon elements in each group to be moved by a distance $$\frac{\lambda}{3} + p\frac{\lambda}{2}$$

and the remaining ribbon element to be moved by $$\frac{\lambda}{6} + p\frac{\lambda}{2}.$$

21. The electro-mechanical grating device as defined in claim 16 wherein four deformable ribbon elements are within one group, and wherein the standoffs of each group defining a height allowing two ribbon elements in each group to be moved by a distance $$\frac{\lambda}{4} + p\frac{\lambda}{2}$$

and a third ribbon element to be moved by $$\frac{\lambda}{8} + p\frac{\lambda}{2}$$

and the remaining ribbon element to be moved by $$\frac{3\lambda}{8} + p\frac{\lambda}{2}.$$

* * * * *